(12) United States Patent
Johnson et al.

(10) Patent No.: US 9,720,306 B2
(45) Date of Patent: Aug. 1, 2017

(54) PLATE FOR CAMERA EQUIPMENT

(71) Applicant: Really Right Stuff, LLC, San Luis Obispo, CA (US)

(72) Inventors: Joseph M. Johnson, San Luis Obispo, CA (US); Matthew L. Burk, San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days.

(21) Appl. No.: 15/161,008

(22) Filed: May 20, 2016

(65) Prior Publication Data

US 2017/0003577 A1  Jan. 5, 2017

Related U.S. Application Data

(63) Continuation of application No. 14/633,733, filed on Feb. 27, 2015, now Pat. No. 9,372,383.

(60) Provisional application No. 61/953,467, filed on Mar. 14, 2014.

(51) Int. Cl.

| H04N 5/225 | (2006.01) |
|---|---|
| G03B 17/56 | (2006.01) |
| H04N 5/232 | (2006.01) |
| F16M 11/28 | (2006.01) |
| F16M 11/24 | (2006.01) |
| F16M 11/04 | (2006.01) |
| F16M 11/08 | (2006.01) |
| F16M 11/14 | (2006.01) |

(52) U.S. Cl.
CPC ......... *G03B 17/561* (2013.01); *F16M 11/041* (2013.01); *F16M 11/08* (2013.01); *F16M 11/14* (2013.01); *F16M 11/24* (2013.01); *F16M 11/242* (2013.01); *F16M 11/28* (2013.01); *G03B 17/568* (2013.01); *H04N 5/2253* (2013.01); *H04N 5/23245* (2013.01); *H04N 5/2251* (2013.01)

(58) Field of Classification Search
CPC ........ F16M 11/08; F16M 11/14; F16M 11/24; F16M 11/28; F16M 11/242; F16M 11/041; H04N 5/2251; H04N 5/2253; H04N 5/23245; G03B 17/561; G03B 17/568
USPC .......................... 347/373, 375, 376
See application file for complete search history.

(56) References Cited

U.S. PATENT DOCUMENTS

| 7,714,722 B2 * | 5/2010 | Marszalek | G08B 13/1409 340/506 |
|---|---|---|---|
| 7,721,893 B2 * | 5/2010 | Law | A45C 11/38 206/316.2 |
| 8,418,973 B2 * | 4/2013 | Liu | F16M 11/041 248/176.1 |
| 2009/0039213 A1 * | 2/2009 | Darrow | B60R 11/02 248/163.1 |
| 2014/0263939 A1 * | 9/2014 | Rinner | F16M 11/10 248/688 |
| 2016/0255249 A1 * | 9/2016 | Pan | G03B 17/561 348/373 |

* cited by examiner

*Primary Examiner* — Ngoc-Yen Vu
(74) *Attorney, Agent, or Firm* — Chernoff Vilhauer McClung & Stenzel, LLP

(57) ABSTRACT

A plate provides clearance between a camera and a quick-release receiver securing the camera to a support.

16 Claims, 11 Drawing Sheets

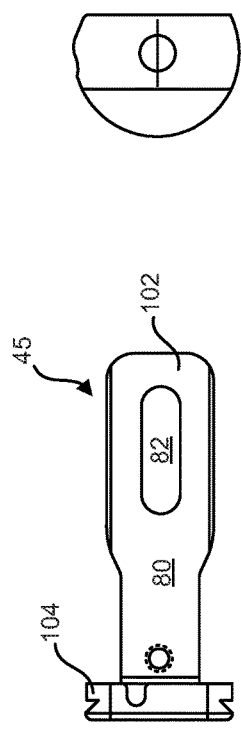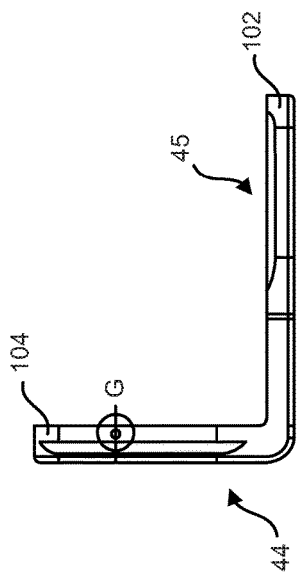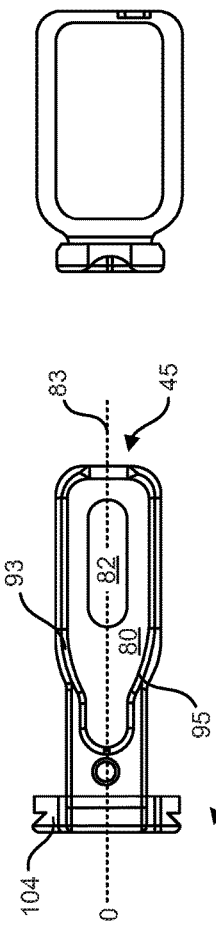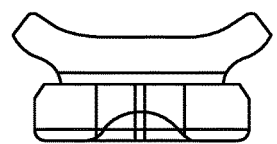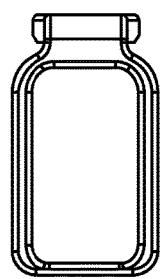

PLATE FOR CAMERA EQUIPMENT

CROSS-REFERENCE TO RELATED APPLICATIONS

This application is a continuation of U.S. patent application Ser. No. 14/633,733, filed Feb. 27, 2015, which application claims the benefit of U.S. Provisional App. No. 61/953,467, filed Mar. 14, 2014.

BACKGROUND OF THE INVENTION

The present invention relates to a bracket suitable for interconnecting camera equipment and a support for camera equipment and, more particularly, to an L-plate bracket facilitating changing the orientation of a supported camera equipment between landscape and portrait orientations.

Camera equipment often includes a threaded receptacle for attaching the equipment to a head mount of a tripod, monopod or other support. A camera may be attached directly to a head mount of a support by a screw projecting from the head mount but a quick-release mounting system is commonly used to secure camera equipment, particularly higher end camera equipment, to a tripod or other support. A quick-release camera mounting system typically includes a plate that is securable to the camera' body by a screw that is engageable with the threaded receptacle in the bottom of the camera. The screw projecting from the head mount provides a means of securing a receiver to the tripod or other camera support. A projection or taper of the camera plate engages a complementary groove or taper of the receiver and the camera plate is typically secured in the receiver by a clamp or other quick-release mechanism. For example, many makers of photographic equipment utilize a quick-release system developed by camera equipment maker Arca-Swiss, International. The Arca-Swiss or arca-type quick-release system utilizes a dovetail tenon in the form of a 38 mm wide plate having at least two opposing edges sloping at 45 degrees. The plate is receivable and securable in a receiver by opposing sloping dovetail surfaces of a clamp, usually operable by a lever or screw, such as the quick-release clamp described in U.S. Pat. No. 6,773,172. The receiver may be attached to the head mount or, more commonly, to an intermediate attaching device, such as a ballhead, pan head or gimbal head, affixed to the head mount.

A ballhead typically comprises a ball which has a radially projecting stem and which is supported in a socket in the ballhead's body. The body of the ballhead is secured to the head mount of a tripod or other support by the screw projecting from the head mount and engaging a threaded aperture in the bottom of the ballhead's body. Camera equipment or a receiver, such as a clamp of a quick-release system, is attached to the end of the stem projecting from the ball by a screw threaded into a longitudinally extending aperture in the stem. The ball and socket joint enables rotation of the ball in the body of the ballhead and the body, typically, includes a mechanism enabling constriction of the socket to lock the ball and the attached camera equipment in a desired attitude relative to the support. While the ball can be rotated 360° around the longitudinal axis of the stem, rotation in directions transverse to the axis of the stem is limited by interference between the stem and the edge of the ballhead's body.

The body of a ballhead may include one or more drop notches providing clearance for the stem to rotate 90° in a direction transverse to the axis of the stem enabling the camera equipment to be moved from a landscape orientation to a portrait orientation and vice versa. Changing the orientation of camera equipment attached to a ballhead from landscape to portrait or vice versa can be problematic. The camera equipment is offset relative to the center of rotation of the ball and as the ball is rotated in directions transverse to the longitudinal axis of the stem the camera shifts both horizontally and vertically. If the camera equipment is heavy, the horizontal movement of the weight may destabilize the support and the vertical displacement of the camera may make using the viewfinder difficult. In addition, shifting the location of the camera's lens will change the setup for the shot particularly if the subject is close, for example, when shooting a macro. It may be necessary to move the tripod to compensate for the change in the relative positions of the camera and the subject. In addition, if the support is not sitting on a level surface, it may not be possible to rotate the ball far enough to attain the portrait orientation before the stem of the ball makes contact with the bottom of the drop notch.

Attaching camera equipment to a support with an L-plate or L-bracket avoids the need to utilize a ballhead drop notch when switching a supported camera from landscape orientation to portrait orientation or vice versa. An L-plate includes a first portion attachable to the bottom of the camera's body and a second portion partially wrapping around the camera's body to extend normal to the first portion and parallel to the side of the camera's body. Each portion of the L-plate includes a retention feature, for example, a tenon of a dovetail, enabling engagement with a receiver portion, for example, an Arca-Swiss type quick-release clamp, when the camera equipment is in either one of the two perpendicular photographic orientations. To switch a camera from a landscape orientation to a portrait orientation, the photographer releases the quick-release device, rotates the camera ninety degrees, and engages and locks the mounting feature of the second portion of the L-plate in the receiver of the quick release system. The camera's lens is, typically, substantially centered with respect to the longitudinal axis of the L-plate's two mounting features and movement of the lens relative to the head mount of the support is minimized when the camera's orientation is changed.

While an L-plate facilitates photography with a tripod, monopod or other support, use of an L-plate with a digital camera can be problematic. Digital cameras are commonly connectable to remote devices, such as a computer, a printer or a video monitor, for downloading and viewing images and video captured with the camera. In addition, remote accessories, such as a microphone, a flash unit or a remote shutter control switch, may be connected to the camera. The connectors for the cable assemblies connecting these remote devices to the camera are commonly located behind one or more doors on the side of the camera's body and when the L-plate and camera are turned for the portrait orientation, there is, typically, insufficient distance between the body of the camera and the L-plate and/or the receiver of the quick-release system to accommodate passage of the cable assembly(ies) connecting the camera to the remote device (s). A cable relief spacer may be inserted between the L-plate and the receiver to provide clearance for connectors and cables but this is, typically, a small, loose piece which can be easily misplaced and may not be carried with the camera equipment and, therefore, may be unavailable when needed. Also, the interconnection of the L-plate to the camera tends to be awkward, and the adjustment of the L-plate tends to be limited and complicated, and the L-plate tends to increase the instability to supporting the camera.

What is desired therefore is a mounting device that permits the orientation of supported camera equipment to be changed in a more efficient manner that does not unduly increase the instability to supporting the camera.

BRIEF DESCRIPTION OF THE DRAWINGS

FIG. 5 is a bottom view and side view of the L-plate.

FIG. 6 is a cut away view of the L-plate.

FIG. 7 is a bottom view of an upward leg of the L-plate.

FIG. 8 is a is a side view of an upward leg of the L-plate.

FIG. 9 is a top view of an upward leg of the L-plate.

DETAILED DESCRIPTION OF PREFERRED EMBODIMENTS

Figure 1:
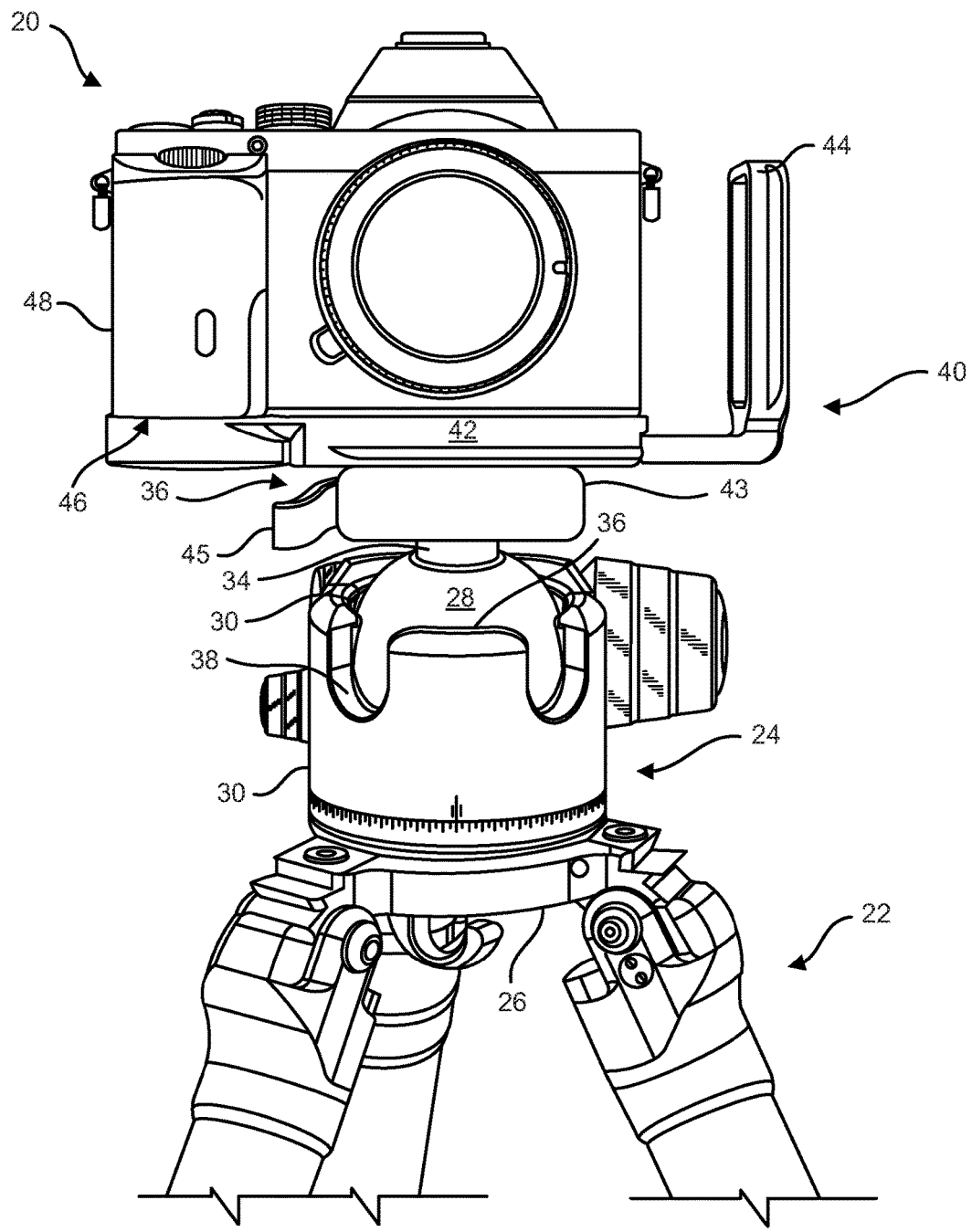
FIG. 1 is a front elevation view of a camera attached in a landscape orientation to a tripod mounted ballhead with an extendible L-plate.

Referring in detail to the drawings where similar parts are identified by like reference numerals, and, more particularly to FIG. 1, to provide stability and to reduce blurring, photographic equipment 20, for example, a camera body 48, a lens and one or more accessories, is often affixed to a support, such as a tripod 22 or monopod. While camera equipment 20 can be attached directly to a tripod 22 or other support, cameras are commonly affixed to a support with an intermediate device, such as a ballhead 24, pan head or gimbal head which is usually secured to the head mount 26 of the support by a screw that projects upward through the head mount into threaded engagement with a threaded aperture in the body of the intermediate device. A ballhead 24 comprises generally a ball 28 which is retained in a socket 30 in the ballhead's body 32. The ball 28 typically includes a radially projecting stem 34 to which the photographic equipment or a receiver of a quick-release system is attached. The ball-in-socket joint enables unlimited rotation of the ball about the longitudinal axis of the stem 34 and limited rotation of the ball in directions transverse to the stem's axis. The ballhead's body 32 typically includes a mechanism enabling constriction of the socket to hold the ball and the camera equipment in a position desired by the photographer.

Rotation of the ball 28 in directions transverse to the longitudinal axis of the stem 34, is limited by interference between the stem and the upper edge 36 of the ballhead's body. The bodies of many ballheads include one or more drop notches 38 in the upper surface of the body to provide additional clearance for the stem enabling the orientation of the camera to be shifted between a landscape orientation with the lower surface 46 of the camera's body 48 arranged substantially horizontal and a portrait orientation with the lower surface arranged substantially vertical. However, utilizing a drop notch of a ballhead to change camera orientation can be problematic because the location of the lens and the center of mass of the photographic equipment move horizontally and vertically as the camera is rotated about the center of the ball in directions transverse to the longitudinal axis of the stem. This can cause the support to become unstable and may substantially alter the setup of a shot, particularly when the subject to be photographed and the camera are close to each other.

Figure 2:
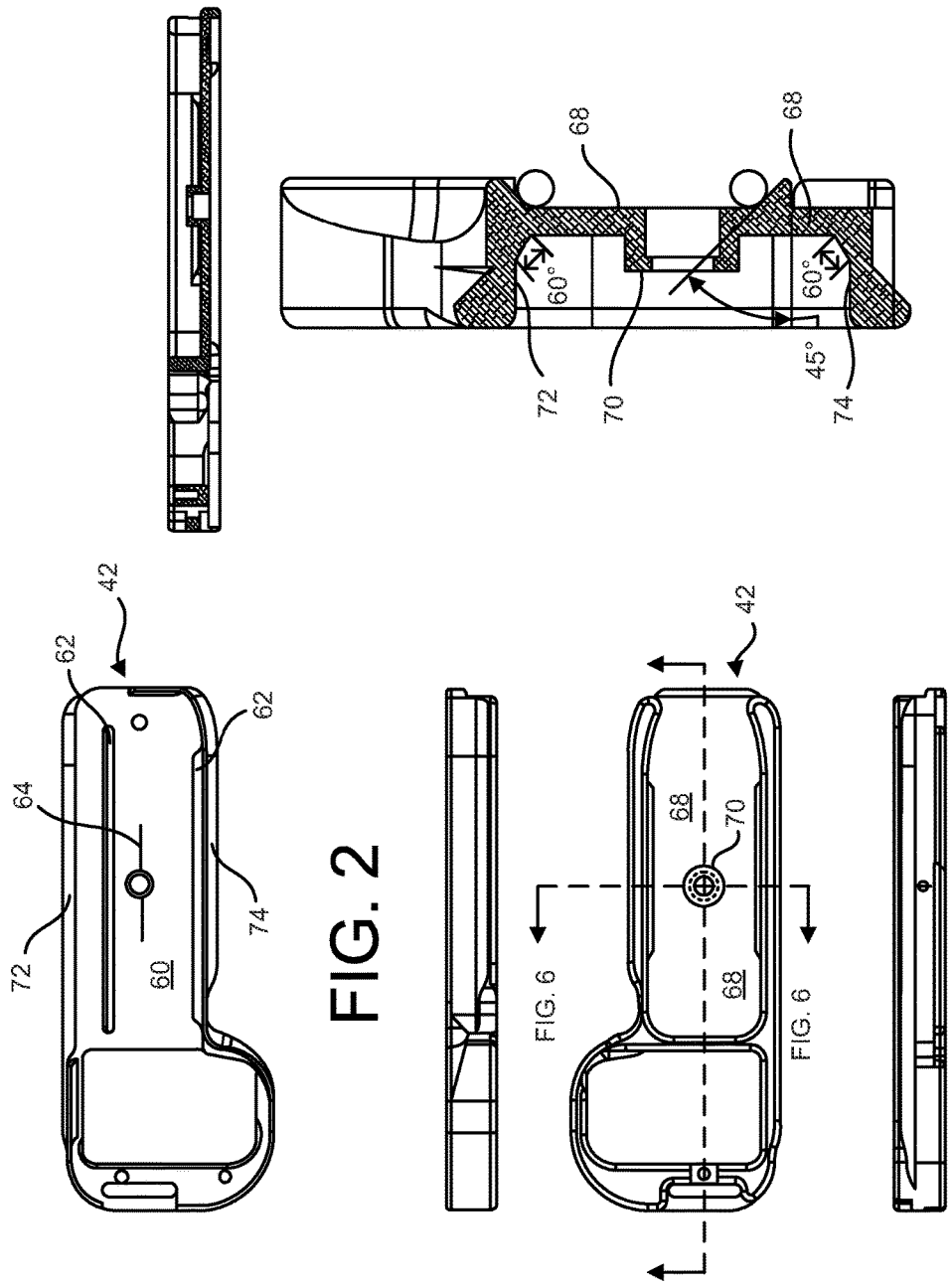
FIG. 2 is a top view and side view of the L-plate.
Figure 3:
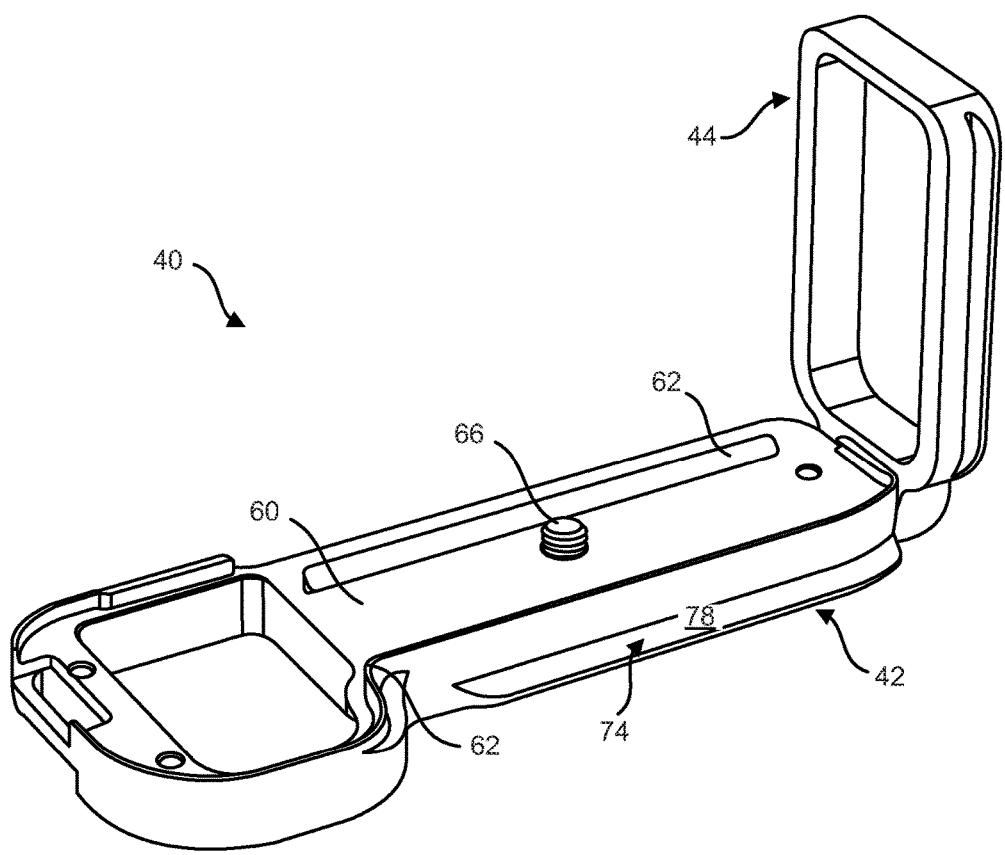
FIG. 3 is a pictoral view of the L-plate.
Figure 4:
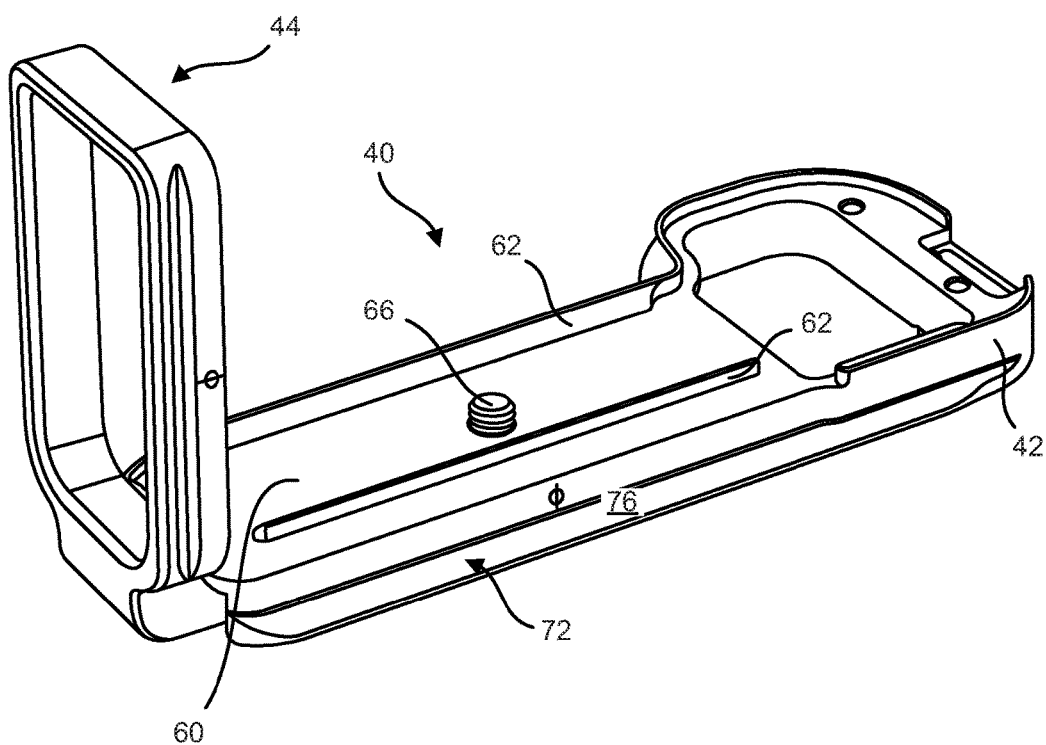
FIG. 4 is a pictorial view of the L-plate.

FIG. 1 illustrates a photographic equipment mounting assembly 40, commonly referred to as an L-plate or L-bracket, comprising a base member or plate 42 and a side member or plate 44 projecting substantially normal to the base plate to wrap around and extend parallel to the side of the camera's body 48. Referring also to FIGS. 2, 3, and 4 the base plate 42 of the extendible L-plate 40 preferably has an upper camera body interface portion 60 adapted to receive and restrain the lower surface 46 of the body 48 of a camera. At least one of the edges 62 of the upper portion 60 of the base plate preferably projects upward from the longitudinal center 64 of the upper portion to define a shallow receptacle shaped for close fitting engagement with the lower surface of the camera's body. This receptacle restrains the camera against twisting about an axis normal to the surface of the upper portion without the need for an intervening layer of friction material which could enhance vibrational freedom of the camera. The interface portion of the base plate also includes a feature enabling the base plate to be secured to the body of the camera. While other securing features such as a latch might be used to secure a camera to a base plate, cameras commonly include a threaded aperture in the lower portion of the body which is engageable by a screw 66 that projects upward through the upper surface of the base plate 42. Preferably, the screw is secured in the base plate. For example, the screw may include a shank with an unthreaded portion proximate the screw's head which permits the screw to rotate in a tapped hole in the base plate without backing out.

Referring also to FIGS. 5 and 6, the lower portion of the base plate 42 includes an L-plate retention feature comprising a first central raised portion 68 having depressed central portion 70 and a general shape, in a plan view, of the letter U. Opposing peripheral surfaces of the legs 72, 74 each comprise a surface portion 76, 78 sloping (e.g., arranged at a forty-five degree angle) so that the cross-section has the shape and dimension of a dovetail tenon and, preferably, the tenon portion of an Arca-Swizz quick-release system. Camera equipment may be attached to a ballhead 24 or other attaching device in the landscape orientation by engaging the base plate 42 of the L-plate 40 with a receiver 36 of a quick-release system, for example, a clamp of the Arca-Swizz quick-release system, which is attached to the stem 34 of the ballhead. To secure the base plate 42 in the receiver 36, the Arca-Swizz receiver typically comprises a lever 45 or screw operated clamping body 43 with sloping opposed jaw surfaces arranged to engage and clamp the sloping surfaces 76, 78 of the base plate 42.

Referring also to FIGS. 7, 8, and 9 a side plate 44 includes an engagement portion 45. A second central raised portion 80, projects outward at the longitudinal center of the depressed central portion 70 of the first raised portion 68. The second central raised portion 80 includes a pair of legs 93 and 95. The second central raised portion 80 is discontinuous comprising an opening 82 enabling location of the camera securing element, the screw 66, at the center 83 of the base plate.

Figure 10:
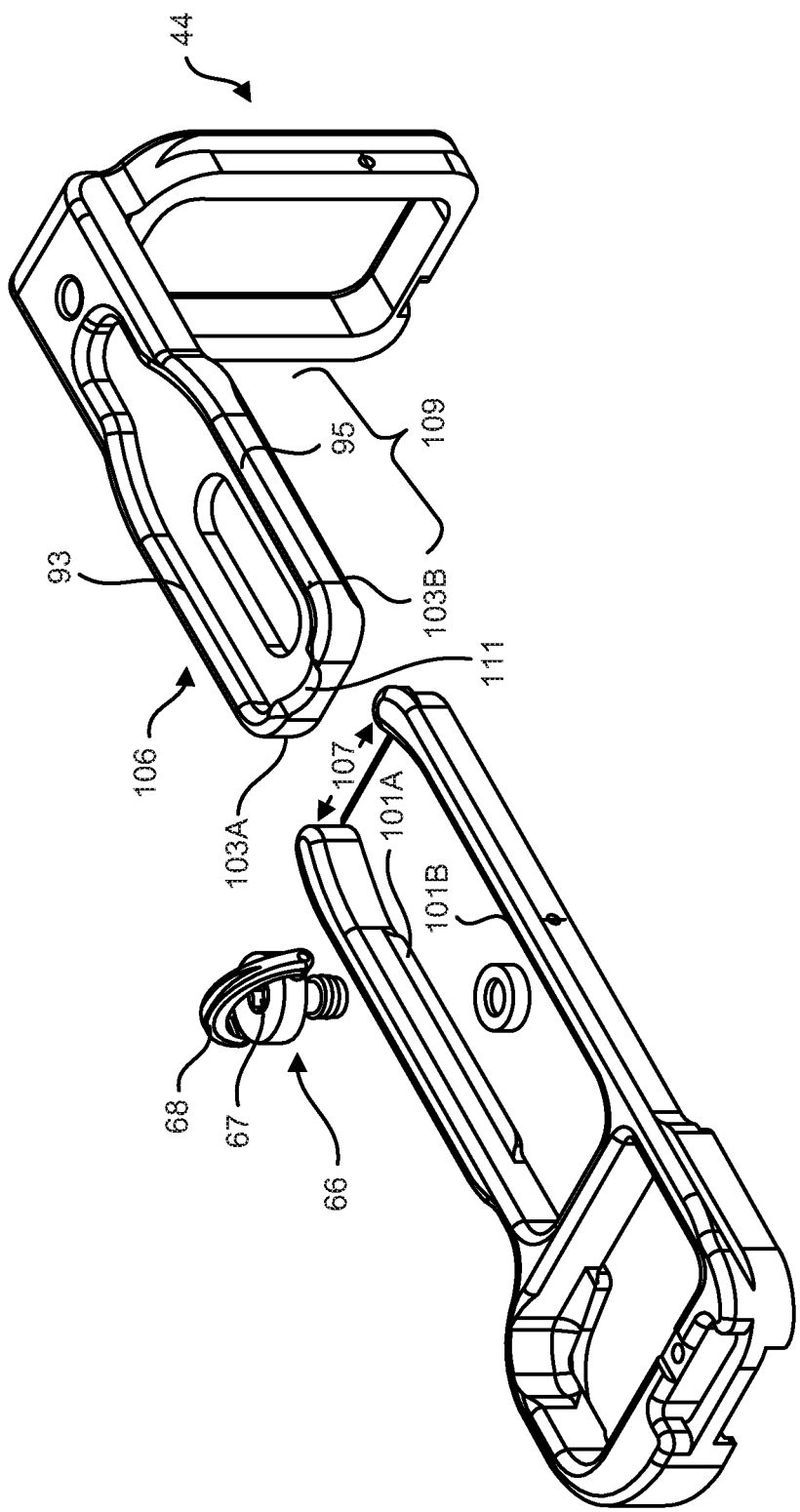
FIG. 10 is a perspective view of the bottom of the L-plate in two parts.
Figure 12:
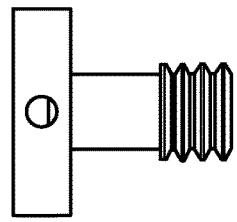
FIG. 12 is a side view of a screw and opening.
Figure 13:
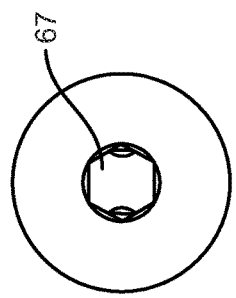
FIG. 13 is a top view of a screw.
Figure 11:
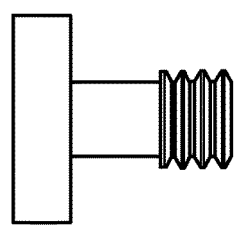
FIG. 11 is a side view of a screw.
Figure 15:
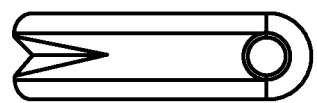
FIG. 15 is a side view of a handle.
Figure 14:
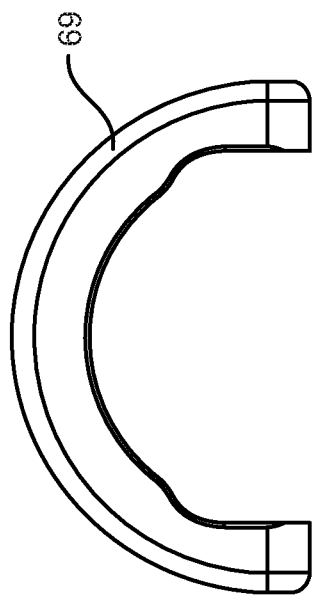
FIG. 14 is a front view of a handle.

The side plate 44 of the L-plate 40 includes a lower leg 102 and an upper leg 104 that projects substantially normal to the lower leg. Referring also to FIG. 10, in an elevation view, the lower leg 102 of the exemplary side plate has the general shape of a rectangular tube section defining a central aperture. The generally parallel vertical legs 93, 95 of the lower leg 102 have generally rectangular cross-sections with opposing peripheral surfaces. The lower leg 102 comprises second L-plate mating feature securable by engagement with the base plate 42. In particular, the base plate 42 and the lower leg 106 include matching sloping surfaces 101A, 101B, and 103A, 103B. The sloping matching services inhibit rocking movement of the lower leg 106 with respect to the base plate 42. The lower leg 102 of the side plate 44 has a generally rectangular cross-section preferably having a dimension approximating the width of the depressed central portion 70 of the base plate 42. The upper surface 80 of the lower leg 102 includes the opening 82 extending a substantial portion of the length of the first central raised portion 68 of the base plate 42.

Referring to FIGS. 11, 12, 13, 14, and 15, the screw 66 includes a socket head cap screw 67 for securing with a tool. In addition, the screw 66 includes a foldable thumb screw 69.

Figure 16:
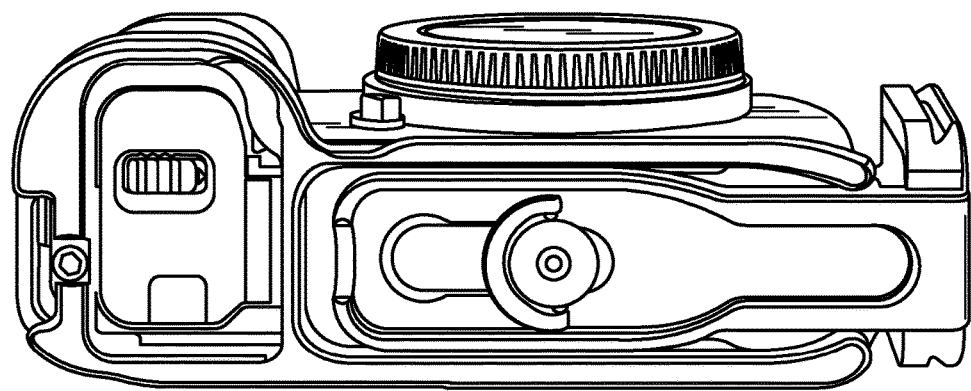
FIG. 16 is a bottom view of a camera with the L-plate attached thereto in a retracted position.
Figure 17:
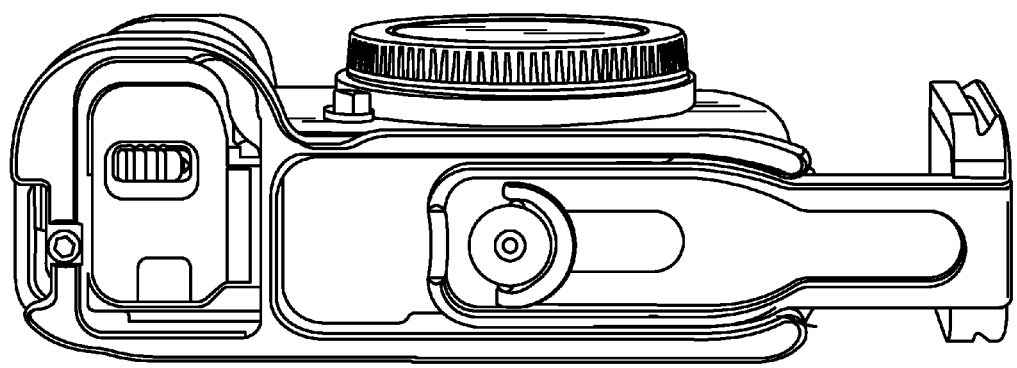
FIG. 17 is a bottom view of the camera with the L-plate attached thereto in an extended position.

By loosening and tightening the screw 66, the location of the side plate 44 relative to the camera can be modified. In addition, the legs 72, 74 define a restricted region 107 that prevents the side plate 44, and in particular an expanded region 109, from extending past a predefined distance. Also, a recessed portion 111 is suitable to receive the foldable thumb screw 69. FIGS. 16 and 17 illustrate the sliding of the side plate 44 relative to the base plate 42. Also, the legs 72, 74 have adjacent inner chamfer (e.g., 60 degree) that assist with aligning and squaring up the L-component to the base component when the thumb screw is engaged.

Referring also to FIG. 1, the camera equipment 20 can be attached to a tripod 22, monopod, or other support in the landscape orientation, e.g. the bottom surface 46 of the camera's body 48 substantially horizontal, by engaging the dovetail tenon of the base plate 42 with the cooperating dovetail clamping surfaces of a clamp portion 43 of a quick-release receiver 36 affixed to the support. To switch the camera to the portrait orientation, e.g. with the bottom surface 46 of the camera substantially vertical, the user releases the clamp of the quick-release receiver and disengages the dovetail tenon of the base plate from the receiver. If the camera is not attached to a remote device by cabling that would interfere with the receiver, the camera equipment 20 can be rotated to the portrait orientation and the dovetail surfaces of the side plate 44 inserted into the clamping body 43 of the receiver 36 and secured.

However, it may be desirable to connect the camera to one or more remotely located accessories, such as a microphone, shutter control switch or a flash unit. In addition, digital cameras are commonly connected to remote devices, such as, a computer, printer or video monitor to enable transferring and viewing images and video captured with the camera. To enable communication with remote devices and accessories, a digital camera commonly includes portions of one or more cable connectors, such as an Ethernet connector or an N-type connector, located behind one or more doors in the side of the camera's body. Plural cable assemblies connect the exemplary camera equipment to one or more remote devices or accessories (not shown). Each cable assembly includes an appropriate connector portion, such as, a universal serial bus (USB) connector, a high definition multi-media interface (HDMI) connector, an N-type connector or other connector utilized in communicating with the specific remote device or accessory. Connectors and cables of some cable assemblies extend distal of the engaging face of the side plate and would interfere with the receiver if the camera was turned to the portrait orientation.

Figure 18:
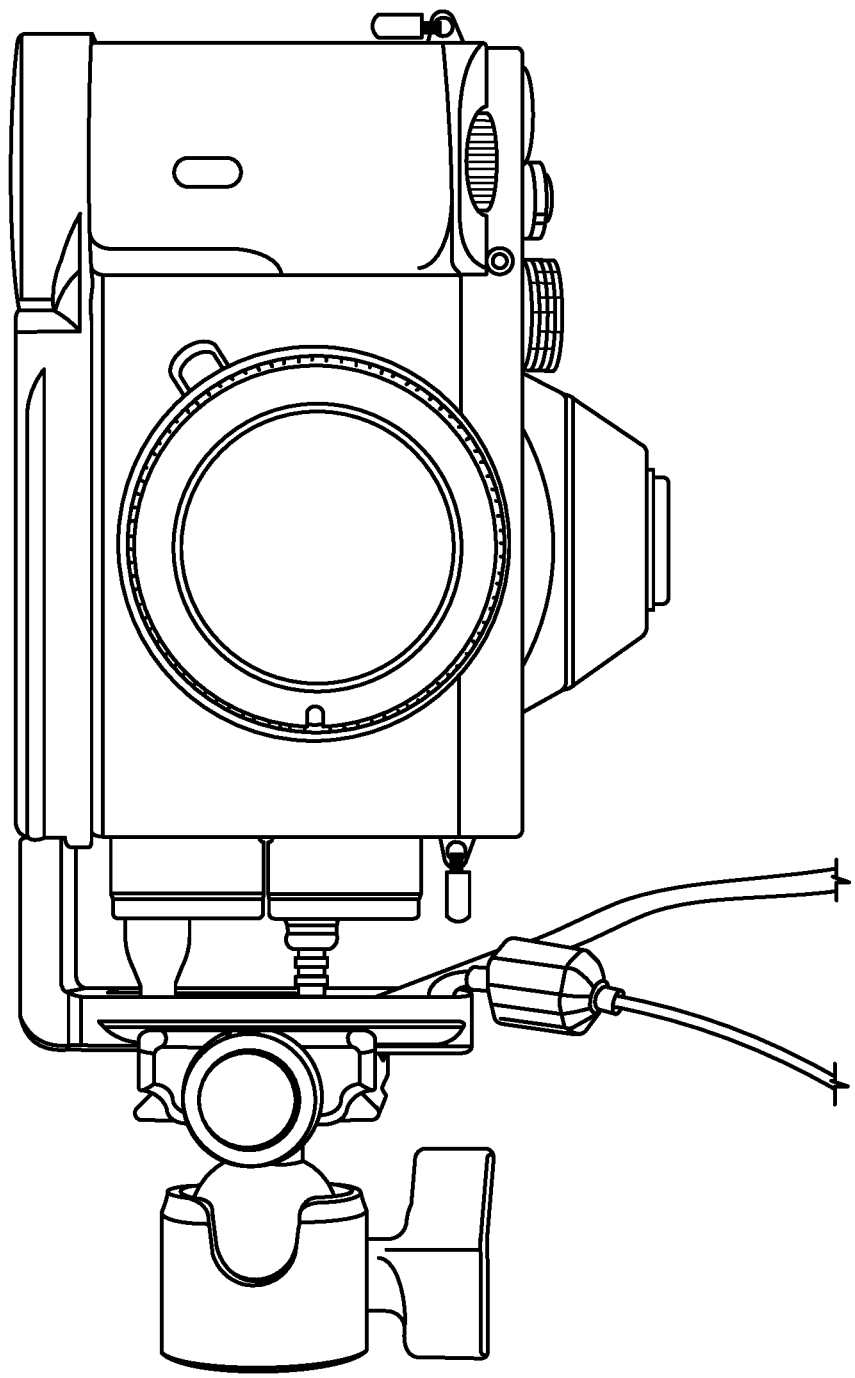
FIG. 18 a front view of the camera with L-plate attached thereto in an extended position.

Referring to FIGS. 16, 17, and 18, to extend the L-plate 40, the user loosens the screw and the base plate and the side plate are slid away from each other while remaining connected by the screw 66. By extending the L-plate, clearance can be provided between the camera's body 48 and the side plate 44 providing clearance for cable assemblies projecting from the side of the camera body.

The two-piece extendable L-plate provides clearance between a camera body and the apparatus securing the camera to a support for cables connected to the side of the camera permitting the camera to be supported on a tripod or other support in either landscape or portrait orientation without the use of a separate spacer element.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A camera mounting assembly for adjustably mounting a camera on a vertical support comprising:
   (a) a base member having an upper portion configured to support a lower surface of the camera and a lower portion forming an opposite pair of lower slots;
   (b) a side member forming an opposite pair of side slots; and
   (c) a fastening element configured to detachably fasten together said side member and said base member such that when the lower surface of the camera is supported by the base member, at least a portion of the side member is aligned with a side surface of the camera and configured such that a pair of moveable jaws of a quick-release mechanism is selectively engageable with the lower slots and side slots to adjustably mount the camera in a landscape orientation and a portrait orientation, respectively, while maintaining the camera in a generally centered position over the vertical support, said fastening element comprising a rotatable member accessible from a bottom surface of said base member when said lower surface of said camera is supported by said base member where rotation of said rotatable member detachably interconnects said side member to said base member when said camera is supported by said base member, said rotatable member movable in a first manner that permits said side member to slide with respect to said base member in such a manner to modify the spacing between said side member and said side surface of said camera when said lower surface of said camera is said supported by said base member, said rotatable member movable in a second manner that prevents said side member to slide with respect to said base member in such a manner to maintain the spacing between said side member and said side surface of said camera when said lower surface of said camera is said supported by said base member, said base member being free from extending along a substantial portion of said side surface of said camera when said camera is supported by said base member and said side member is detached from said base member;

(d) wherein said base member defines a cavity with a lower opening between said upper portion, said opposite pair of lower slots, and a lower surface of said base member;

(f) wherein said side member includes a leg portion that extends within said cavity defined by said base member and said fastening element detachably fastens together said leg portion of said side member and said base member.

2. The camera mounting assembly of claim 1 wherein the side member includes a side arm and a lower arm in a generally L-shaped arrangement, the side arm being aligned with the side surface of the camera when the lower surface of the camera is supported by the base member.

3. The camera mounting assembly of claim 2 wherein the lower arm has a length shorter than the length of both the base member and the side arm.

4. The camera mounting assembly of claim 3 wherein the lower arm is integral with the side arm.

5. The camera mounting assembly of claim 1 wherein said opposite pair of lower slots are dovetailed slots.

6. The camera mounting assembly of claim 5 wherein said opposite pair of side slots are dovetailed slots.

7. The camera mounting assembly of claim 6 further comprising said base member defining a threaded hole through said upper portion of said base member.

8. The camera mounting assembly of claim 7 wherein said side member defines a cutout to provide access to the side of said camera.

9. The camera mounting assembly of claim 1 wherein said upper portion of said base member includes a peripheral edge that projects upward to define a shallow receptacle.

10. The camera mounting assembly of claim 1 further comprising a threaded member that extends through said base member to secure said camera to said base member.

11. The camera mounting assembly of claim 1 wherein said lower portion of said base member includes said central raised portion having a depressed central portion.

12. The camera mounting assembly of claim 11 wherein said central portion is generally a U shape.

13. The camera mounting assembly of claim 11 wherein said side member and said base member define a restricted region that prevents said side member from sliding past a predefined distance with respect to said base member.

14. The camera mounting assembly of claim 1 wherein fastening element includes a rotatable element.

15. The camera mounting assembly of claim 14 wherein said fastening element includes a rotatable thumb screw.

16. The camera mounting assembly of claim 1 wherein said side member and said base member define a restricted region that prevents said side member from sliding past a predefined distance with respect to said base member.

* * * * *

UNITED STATES PATENT AND TRADEMARK OFFICE
CERTIFICATE OF CORRECTION

PATENT NO.       : 9,720,306 B2
APPLICATION NO.  : 15/161008
DATED            : August 1, 2017
INVENTOR(S)      : Joseph M. Johnson, Sr.

It is certified that error appears in the above-identified patent and that said Letters Patent is hereby corrected as shown below:

In the Specification

Column 1, Line 26:
Change "camera'" to read --camera's--.

Column 3, Line 32:
After "FIG. 18" insert --is--.

Column 4, Line 51:
Change "Arca-Swizz" to read --Arca-Swiss--.

Column 4, Lines 55-56:
Change "Arca-Swizz" to read --Arca-Swiss--.

Column 4, Line 58:
Change "Arca-Swizz" to read --Arca-Swiss--.

Signed and Sealed this
Tenth Day of April, 2018

Andrei Iancu
*Director of the United States Patent and Trademark Office*